(12) United States Patent
Chang et al.

(10) Patent No.: US 10,409,735 B2
(45) Date of Patent: Sep. 10, 2019

(54) ELECTRONIC DEVICE AND DATA EXCHANGE METHOD INCLUDING PROTOCOL INDICATIVE OF MODES OF OPERATION

(71) Applicant: MACRONIX INTERNATIONAL CO., LTD., Hsinchu (TW)

(72) Inventors: Kuen Long Chang, Taipei (TW); Yu Chen Wang, Kaohsiung (TW); Ken Hui Chen, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 438 days.

(21) Appl. No.: 15/133,864

(22) Filed: Apr. 20, 2016

(65) Prior Publication Data
US 2017/0060785 A1 Mar. 2, 2017

Related U.S. Application Data

(60) Provisional application No. 62/211,891, filed on Aug. 31, 2015.

(51) Int. Cl.
| | | |
|---|---|---|
| G06F 13/14 | (2006.01) | |
| G06F 13/12 | (2006.01) | |
| G06F 13/364 | (2006.01) | |
| G06F 12/02 | (2006.01) | |
| G06F 13/42 | (2006.01) | |
| G06F 13/40 | (2006.01) | |

(52) U.S. Cl.
CPC ........ *G06F 13/126* (2013.01); *G06F 12/0246* (2013.01); *G06F 13/364* (2013.01); *G06F 13/404* (2013.01); *G06F 13/4291* (2013.01)

(58) Field of Classification Search
None
See application file for complete search history.

(56) References Cited

U.S. PATENT DOCUMENTS 9,015,365 B2   4/2015  Chang et al.
2008/0252505 A1* 10/2008  Lee .................. H03M 1/66
                                              341/146

(Continued)

FOREIGN PATENT DOCUMENTS

TW        201432468 A     8/2014

OTHER PUBLICATIONS

Design and Implementation of FLASH Programming Module in MCU Based on I2C Interface, in "Proceedings of the 17th Annual Conference of Computer Engineering and Technology and the 3rd Microprocessor Technology Forum," Jul. 20, 2013.

(Continued)

*Primary Examiner* — Ilwoo Park
(74) *Attorney, Agent, or Firm* — Finnegan, Henderson, Farabow, Garrett & Dunner LLP

(57) ABSTRACT

An electronic device includes a processor coupled to a memory device, through a data bus to receive and transmit bits on the data bus. The processor is configured to transmit a message including a first bit indicative of controlling the data bus, address bits indicative of an address identifying the memory device, and a second bit indicative of whether the processor intends to read data from or write data to the memory device; and transmit a third bit indicative of a mode of operation of the memory device.

20 Claims, 11 Drawing Sheets

(56) References Cited

U.S. PATENT DOCUMENTS

| | | | |
|---|---|---|---|
| 2009/0179785 A1* | 7/2009 | Lee | H03M 1/66 341/145 |
| 2010/0131676 A1* | 5/2010 | Escamilla | G06F 12/0623 710/4 |
| 2014/0173162 A1* | 6/2014 | Danis | G06F 13/32 710/310 |
| 2017/0090907 A1* | 3/2017 | Kurosawa | G06F 8/654 |

OTHER PUBLICATIONS

Office Action dated Jul. 6, 2018, Application No. 201610455614.8, issued by the State Industrial Property Office of the Peoples Republic of China.

* cited by examiner

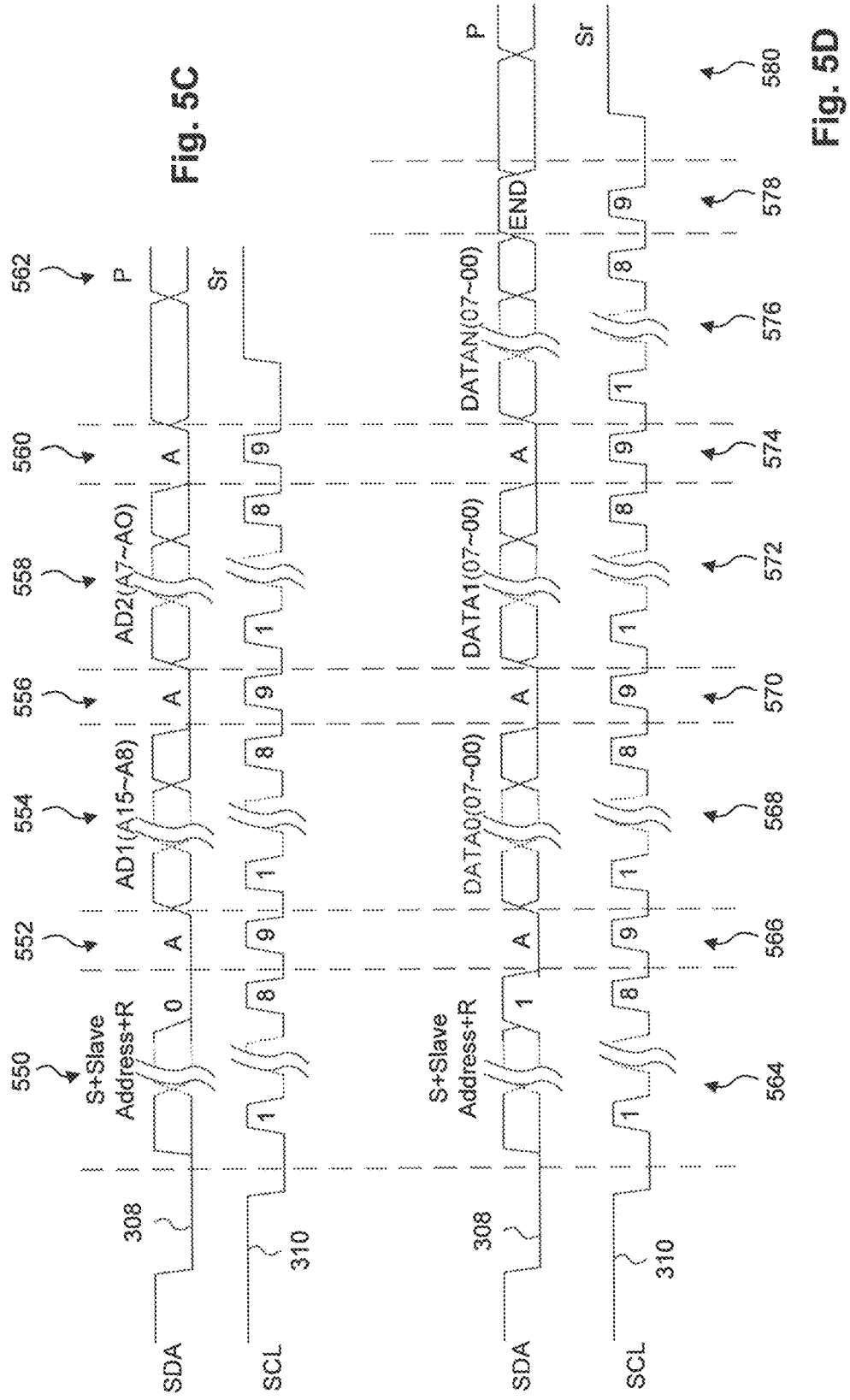

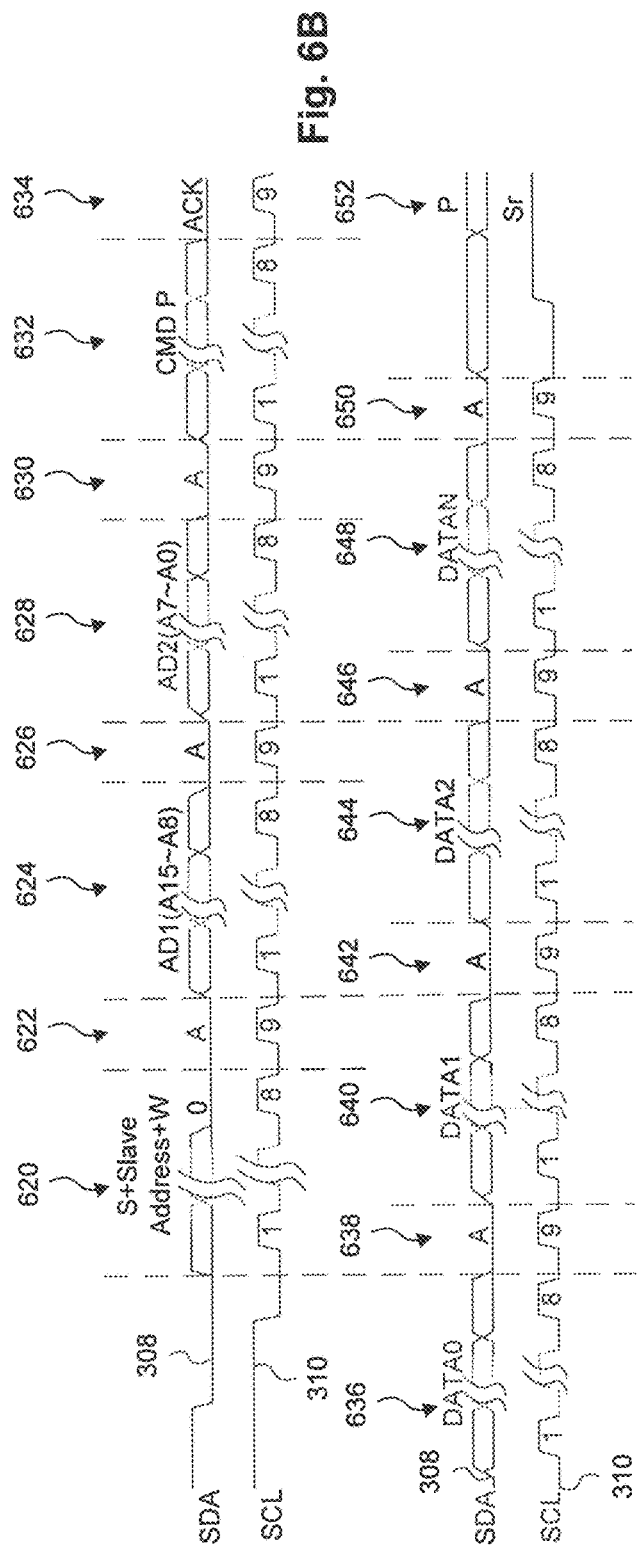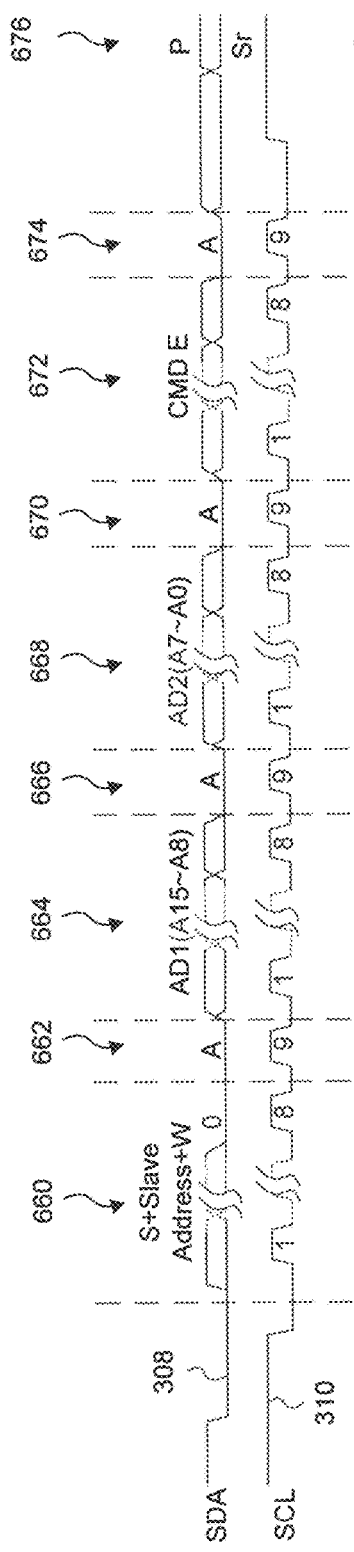

ELECTRONIC DEVICE AND DATA EXCHANGE METHOD INCLUDING PROTOCOL INDICATIVE OF MODES OF OPERATION

CROSS-REFERENCE TO RELATED APPLICATION

This application is based upon and claims priority to Provisional Application 62/211,891, filed Aug. 31, 2015, the entire contents of which are incorporated herein by reference.

FIELD

Exemplary embodiments relate to an electronic device and data exchange method including I²C protocol and, more particularly, to an electronic device and data exchange method including an I²C protocol that indicates modes of operation.

BACKGROUND

Many memory devices are compatible with the Inter-integrated circuit (I²C) protocol. The I²C protocol provides for communication between multiple master devices and multiple slave devices. FIG. 1 is a schematic diagram showing a conventional I²C device configuration 100, including two master devices 102 and 104 and two slave devices 106 and 108 coupled to each other by a serial data line/bus (SDA) 110 and a serial clock line/bus (SCL) 112. SDA 110 is configured to transmit data or address bits between master and slave devices and SCL is configured to transmit clock signals to the master and slave devices.

FIG. 2A is an exemplary timing diagram showing an exemplary communication on SDA 110 of I²C device configuration 100 in a write mode. To communicate, a master device, e.g., master device 102 or 104, transmits a start bit S followed by multiple address bits of the address identifying a slave device, e.g., slave device 106 or 108 with which the master device is communicating. The identifying address bits are followed by an RAN bit indicating whether the master device intends to write to or read from the slave device. For example, a zero ("0") value of the R/W bit indicates a write mode while a one ("1") value indicates a read mode. The slave devices connected to SDA 110 read the transmitted address bits. The slave device identified by the identifying address bits transmits an acknowledgement bit A, assuming the slave device exists. After receiving the acknowledgement, the master device transmits groups of data or memory address location bits (D/Add) on SDA 110 to the slave device. The slave device transmits an acknowledgement bit A or no acknowledgement bit NA on SDA 110 in response to receiving each group of bits D/Add from the master device. The transmitting of data or address bits ID/Add by the master device and transmitting of an acknowledgment bit A/NA by the slave device continue until the master device sends a stop bit P to stop the transmission or a re-start bit Sr indicating the master device wishes to retain control of the bus for another operation.

FIG. 2B is an exemplary timing diagram showing a communication on SDA 110 of I²C device configuration 100 in a read mode. Similar to the write mode, the master device, e.g., master device 102 or 104, transmits a start bit S followed by multiple address bits of the address identifying a slave device, e.g., slave device 106 or 108, with which the master device is communicating. The identifying address bits are followed by an R/W bit (R/W=1) indicating the master device intends to read from the slave device. The slave device identified by the identifying address bits transmits an acknowledgement bit A and transmits groups of data bits D to the master device. After receiving the data, the master device transmits an acknowledgement bit A or no acknowledgement bit NA. The transmitting of data from the slave device and acknowledging by the master device continues until the master device sends a stop bit P to stop the transmission or a re-start bit Sr indicating the master device wishes to retain control of the bus.

Flash memory devices can be controlled to perform several types of write operations, such as program, sector erase, block erase, and chip erase, and at least two types of read operations, such as normal read and fast read. The conventional I²C protocol cannot discern these different operations, which limits the ability to control operation of a flash memory device using the I²C protocol.

SUMMARY OF EMBODIMENTS

According to a first aspect of the present disclosure, there is provided an electronic device including a processor coupled to a memory device, through a data bus to receive and transmit bits on the data bus. The processor is configured to transmit a message including a first bit indicative of controlling the data bus, address bits indicative of an address identifying the memory device, and a second bit indicative of whether the processor intends to read data from or write data to the memory device; and transmit a third bit indicative of a mode of operation of the memory device.

According to a second aspect of the present disclosure, there is provided a memory device coupled to a control unit, through a data bus to receive and transmit bits on the data bus. The memory device is configured to receive a message from the control unit, the message including a first bit indicative of the control unit controlling the data bus, address bits indicative of an address identifying the memory device, and a second bit indicative of whether the control unit intends to read data from or write data to the memory device; and receive a third bit from the control unit, the third bit being indicative of a mode of operation of the memory device.

According to a third aspect of the present disclosure, there is provided a data exchange method executable by an electronic device, the electronic device including a data bus, and a processor coupled to a memory device through the data bus to receive and transmit bits on the data bus. The method includes transmitting, by the processor, a message including a first bit indicative of controlling the data bus, address bits indicative of an address identifying the memory device, and a second bit indicative of whether the processor intends to read data from or write data to the memory device; and transmitting, by the processor, a third bit indicative of a mode of operation of the memory device.

According to a fourth aspect of the present disclosure, there is provided a data exchange method executable by a memory device coupled to a control unit through a data bus to receive and transmit bits on the data bus. The method includes receiving a message from the control unit, the message including a first bit indicative of controlling the data bus, address bits indicative of an address identifying the memory device, and a second bit indicative of whether the control unit intends to read data from or write data to the memory device; and receiving a third bit from the control unit indicative of a mode of operation of the memory device.

BRIEF DESCRIPTION OF THE DRAWINGS

Reference will now be made, by way of example, to the accompanying drawings which show example embodiments of the present application, and in which:

FIGS. 5C and 5D are exemplary read-mode timing diagrams showing data and clock signals transmitted on the data bus and the clock bus shown in FIG. 3, consistent with embodiments of the present disclosure;

FIG. 6B is an exemplary program-mode timing diagram showing data and clock signals transmitted on the data bus and the clock bus shown in FIG. 3, consistent with embodiments of the present disclosure;

FIG. 6C is an exemplary erase-mode timing diagram showing data and clock signals transmitted on the data bus and the clock bus shown in FIG. 3, consistent with embodiments of the present disclosure;

DESCRIPTION OF EMBODIMENTS

Hereinafter, embodiments consistent with the disclosure will be described with reference to the drawings. Wherever possible, the same reference numbers will be used throughout the drawings to refer to the same or like parts.

Figure 1:
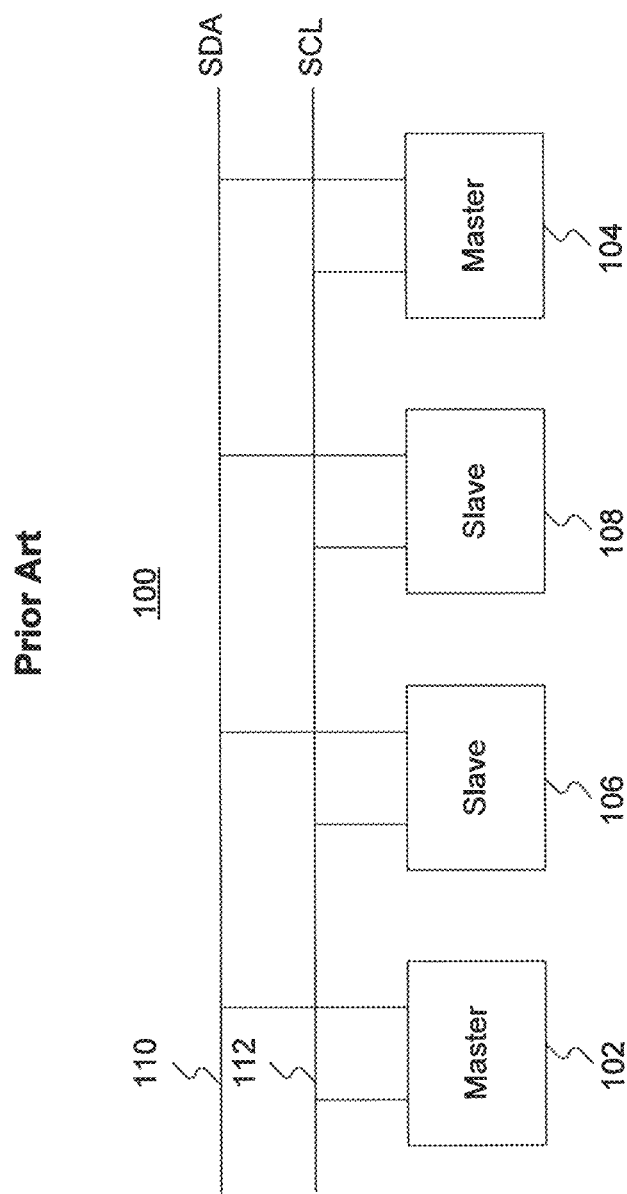
FIG. 1 is a schematic diagram showing a conventional I²C configuration.
Figure 2:
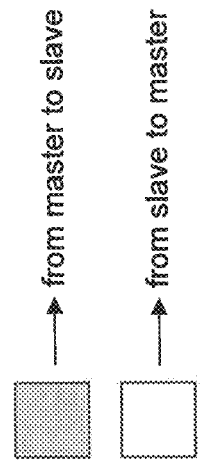
FIG. 2A shows an exemplary timing diagram of a communication on a conventional I²C data bus in a write mode.
FIG. 2B shows an exemplary timing diagram of a communication on a conventional I²C data bus in a read mode.
Figure 3:
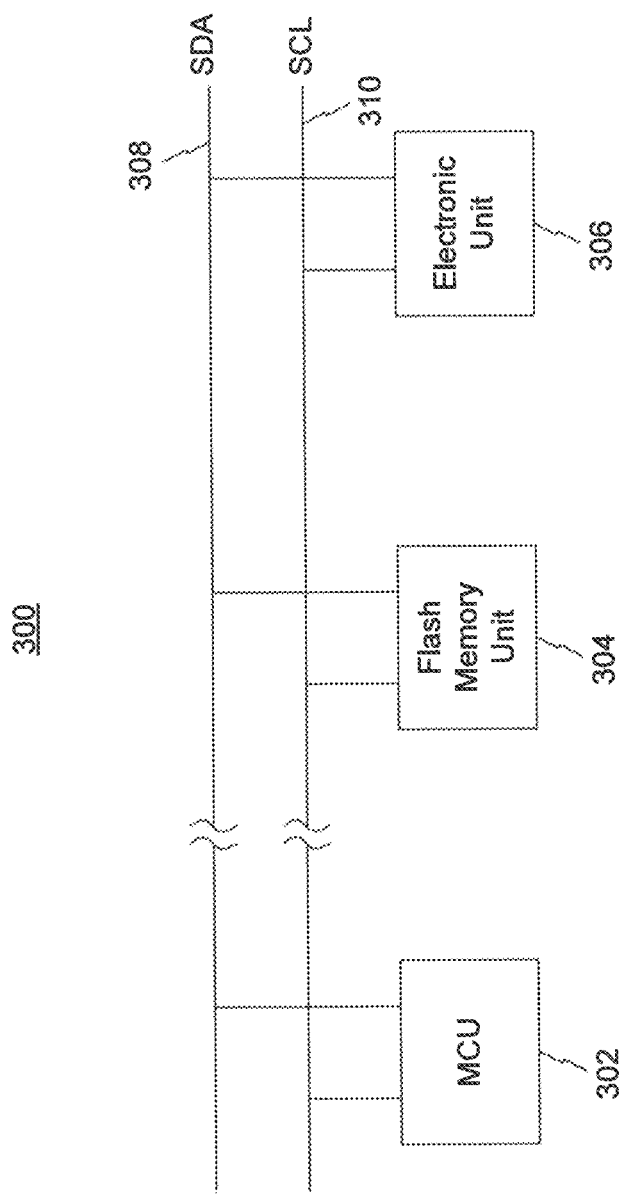
FIG. 3 is a block diagram showing an exemplary I²C device configuration consistent with embodiments of the present disclosure.

FIG. 3 is a block diagram showing an exemplary electronic device 300 consistent with embodiments of the present disclosure. Device 300 includes a micro controller unit (MCU) 302, which includes a processor, a flash memory unit 304, an electronic unit 306, an SDA 308, and an SCL 310. Electronic unit 306 includes a memory device that may include a volatile or non-volatile memory. MCU 302 is configured to write data to or read data from flash memory unit 304 or electronic unit 306. SDA 308 is configured to transmit data or addresses between MCU 302, flash memory unit 304, and electronic unit 306. SCL 310 is configured to transmit clock signals to MCU 302, flash memory unit 304, and electronic unit 306 so that they can receive or transmit bits of data or address on SDA 308. Although one MCU, one flash memory unit, and one electronic unit are illustrated in FIG. 3, the present disclosure is not so limited. Device 300 may include more than one MCU, one flash memory unit, and one electronic unit.

In addition, although FIG. 3 shows MCU 302 and units 304 and 306 included in the same device 300, MCU 302 may instead be located external to a device including units 304 and/or 306. For example, MCU 302 may be included in a host device coupled via SDA 308 and SCL 310 to access units 304 and 306. To illustrate this, FIG. 3 illustrates SDA 308 and SCL 310 as including a break between MCU 302 and units 304 and 306.

MCU 302, flash memory unit 304, and electronic unit 306 are configured to communicate on SDA 308 in a manner consistent with the I²C protocol. However, MCU 302 and flash memory unit 304 are further configured, consistent with embodiments of the present disclosure, to control flash memory unit 304 to operate in the various modes of read and write operations unique to flash memory, while using the I²C protocol.

Figure 4A:
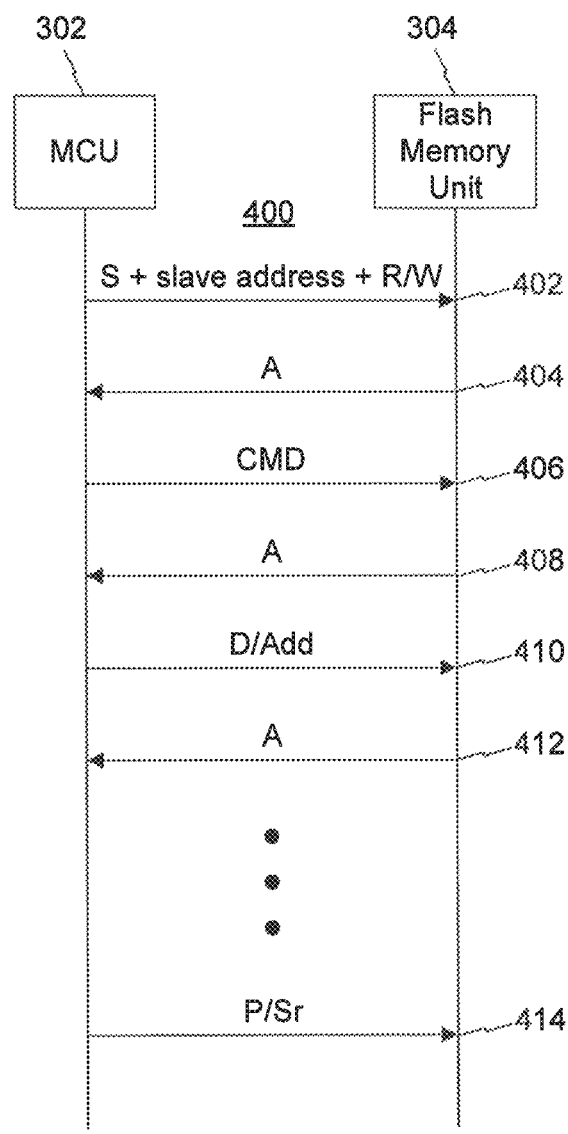
FIG. 4A shows a method performed by the I²C device configuration shown in FIG. 3 including a protocol indicating modes of operation, consistent with embodiments of the present disclosure.

FIG. 4A shows an exemplary method 400 for performing a memory operation on flash memory unit 304 using the I2C protocol and including novel protocol features for implementing modes of operation consistent with embodiments of the present disclosure. Although only MCU 302 and flash memory unit 304 are illustrated in FIG. 4A, MCU 302 may be coupled to one or more other flash memory units. For example, electronic unit 306 may be a flash memory unit. In addition, flash memory unit 304 may be coupled to one or more other MCUs.

in step 402, MCU 302 is configured to transmit a message including a start (first) bit S, slave address bits representing an address identifying a slave device, and an R/W (second) bit on SDA 308. The start bit S indicates MCU 302 is taking control of SDA 308. The slave address is the identifying address of a unit with which MCU 302 wishes to communicate. In the illustrated embodiment, the slave address is the identifying address of flash memory unit 304. The R/W bit indicates whether MCU 302 intends to write data to or read data from flash memory unit 304. Rash memory unit 304 receives the message and is configured to transmit an acknowledgement bit A to MCU 302 in step 404. In step 406, MCU 302 is configured to transmit a command CMD (third) bit or bits indicating a predetermined mode of flash memory write or read operation that MCU 302 will perform on flash memory unit 304. For example, different possible modes of flash memory write operation include, for example, programming flash memory unit 304, erasing data stored in flash memory unit 304 in a manner that data are erased block-by-block or sector-by-sector, or all data stored in flash memory device 304 are erased at once. Different possible modes of read operation include, for example, reading data from flash memory unit 304 at a normal speed or fast speed as defined in, for example, the conventional Serial Peripheral Interface (SPI) flash command protocol. The command CMD bit(s) may indicate that MCU 302 wishes to program, erase, or read data stored in flash memory unit 304 at a predetermined speed.

In step 408, in response to command CMD bit(s), flash memory unit 304 is configured to transmit an acknowledgement bit A to MCU 302. In step 410, after receiving the acknowledgement, MCU 302 is configured to transmit predetermined bits of data or address D/Add to flash memory unit 304. In step 412, flash memory unit 304 is configured to transmit to MCU 302 an acknowledgement bit A indicating receipt of the data or address bits, or no acknowledgement bit (NA) indicating failure to receive data or address bits from MCU 302. In some embodiments, the process of transmitting data or address bit from MCU 302, such as in step 410, and transmitting an acknowledgement bit or no acknowledgement bit from flash memory unit 304, such as in step 412, is repeated until MCU 302 completes transmission of data or address bits to flash memory unit 304. In step 414, MCU 302 is configured to transmit a stop bit P to conclude transmission or a re-start bit Sr to indicate it wishes to retain control of SDA 308. The presence of the command CMD bit(s) enables flash memory unit 304 to recognize the required mode of operation while communicating with MCU 302 using the I$^2$C protocol. For example, on the basis of the command CMD bits, flash memory unit 304 is controlled to receive data or address bits to program its memory cells (storage device), erase data stored in its memory cells or read data at a predetermined speed.

Figures 4B, 4C:
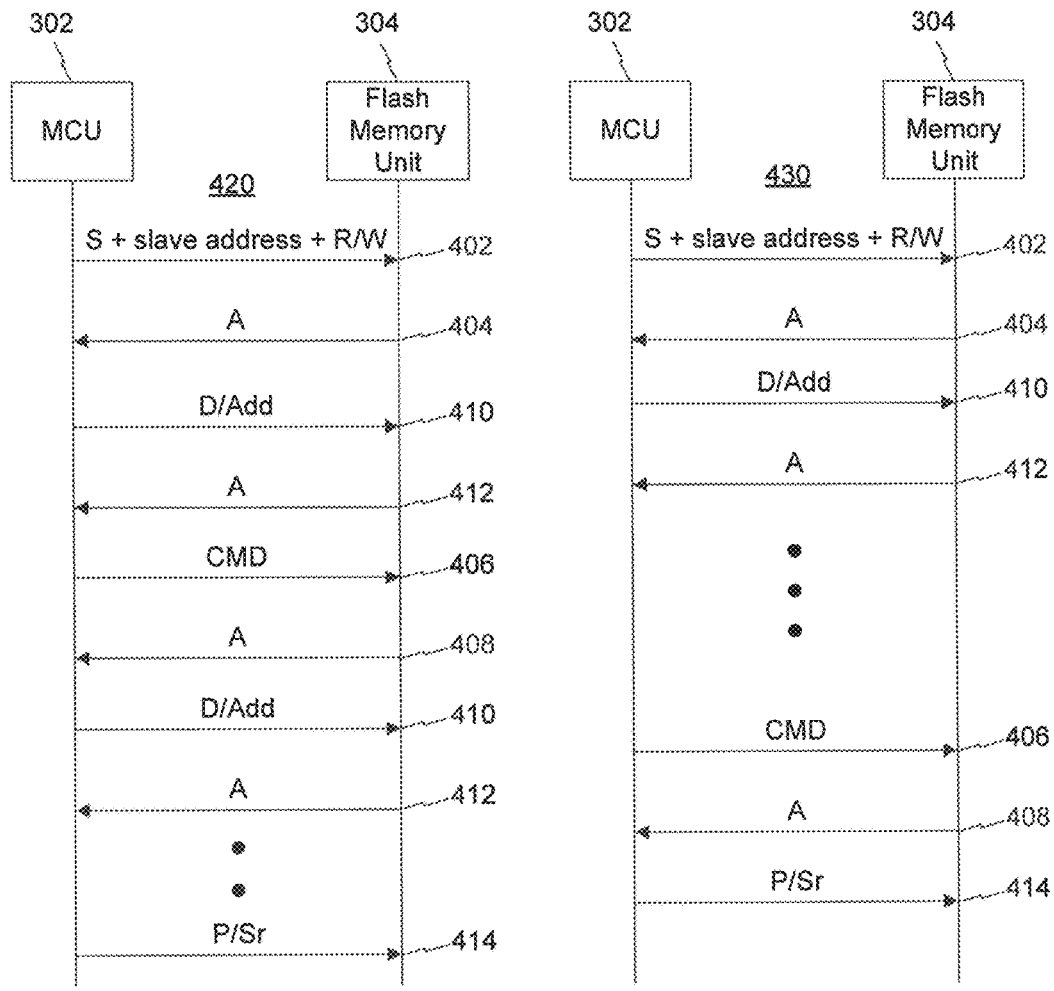
FIG. 4B shows another method performed by the I²C device configuration shown in FIG. 3 including a protocol indicating modes of operation, consistent with embodiments of the present disclosure.
FIG. 4C shows another method performed by the I²C device configuration shown in FIG. 3 including a protocol indicating modes of operation, consistent with embodiments of the present disclosure.

FIG. 4B illustrates a method 420 that embodies a variation of method 400. In method 420, steps 406 and 408 are performed between two data or address transmitting steps 410.

FIG. 4C illustrates a method 430 that embodies another variation of method 400. In method 430, steps 406 and 408 are performed immediately before step 414.

Figure 5A:
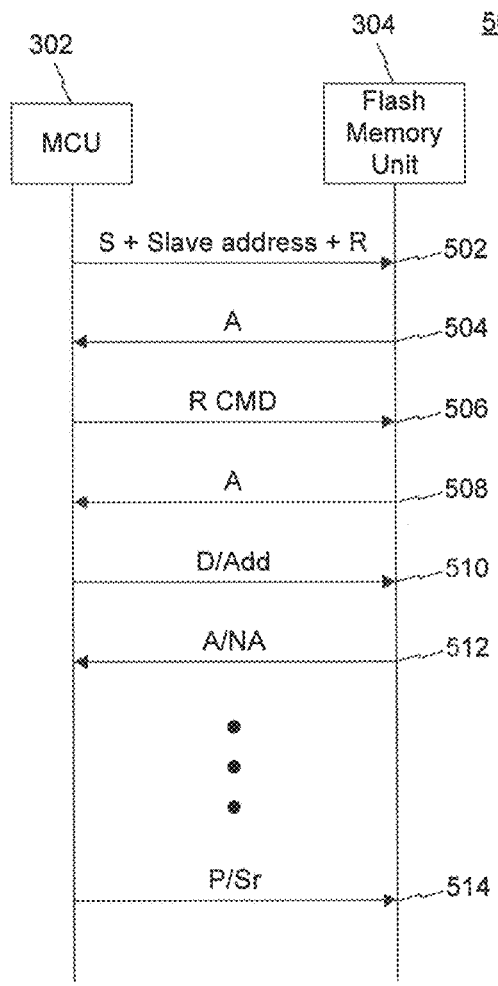
FIGS. 5A and 5B show methods performed by the I²C device configuration shown in FIG. 3 in a read mode, consistent with embodiments of the present disclosure.
Figure 5B:
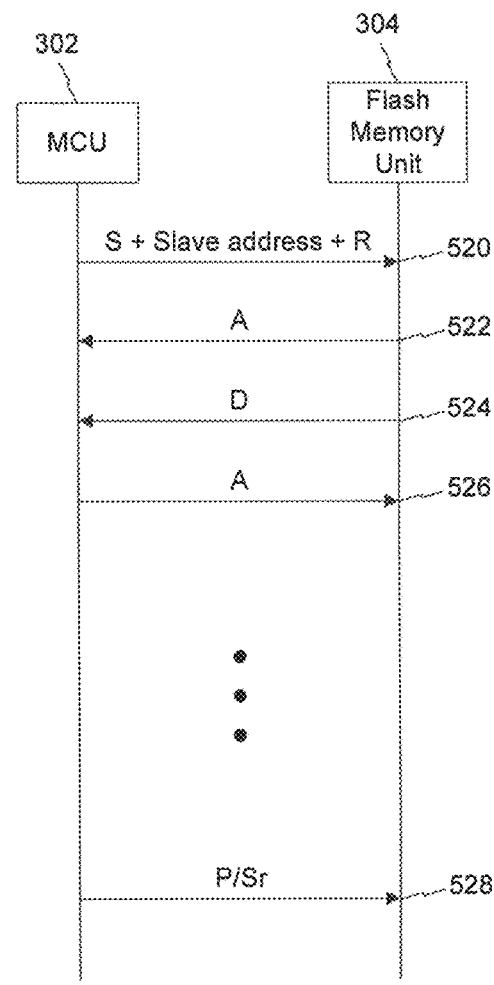

FIGS. 5A and 5B show a method 500 for performing a read operation on flash memory unit 304, consistent with embodiments of the present disclosure. Referring to FIG. 5A, in step 502, MCU 302 is configured to transmit a message including a start bit S, slave address bits, and a read bit R on SDA 308 to a desired memory unit. In the illustrated embodiment, the desired memory unit is flash memory unit 304 so that the slave address bits are the identifying address of flash memory unit 304. Flash memory unit 304 receives the message and is configured to transmit an acknowledgement bit A to MCU 302 in step 504. In step 506, MCU 302 is configured to transmit a read command R CMD bit or bits indicating a particular mode of read operation MCU 302 will perform on flash memory unit 304. For example, the read command R CMD bit(s) may indicate that MCU 302 wishes to read data stored in flash memory unit 304 at a normal speed or fast speed. In some embodiments, step 506 may be omitted if a default read mode between MCU 302 and flash memory unit 304 is performed at a default speed. That is, when MCU 302 does not transmit any command bit to flash memory unit 304, flash memory unit 304 recognizes that as a command to perform a read operation at a default speed.

In step 508, flash memory unit 304 is configured to transmit an acknowledgement bit A to MCU 302. If step 506 is omitted, step 508 is also omitted. In step 510, after receiving the acknowledgement bit A, MCU 302 is configured to transmit predetermined bits of data or address D/Add to flash memory unit 304. For example, MCU 302 transmits particular memory address bits that identify memory cells in flash memory unit 304 where desired data are stored, indicating MCU 302 wishes to read the desired data from those memory cells. In some embodiments, the memory address bits indicate a start address. The read operation is conducted starting from reading data stored at the start address and addresses following the start address.

In step 512, memory unit 304 is configured to transmit to MCU 302 an acknowledgement bit A indicating receipt of the address bits from MCU 302. In some embodiments, the process of transmitting address bits from MCU 302, such as in step 510, and transmitting acknowledgement bit A from flash memory unit 304, such as in step 512, is repeated until MCU 302 completes transmission of address bits to flash memory unit 304. In step 514, MCU 302 is configured to transmit a stop bit P to conclude transmission or a re-Start bit Sr to indicate it wishes to retain control of SDA 308.

After flash memory unit 304 receives the read command R CMD bit(s) and address bits indicating one or more memory addresses of memory cells where the desired data are stored, MCU 302 can read data from flash memory unit 304. Referring to FIG. 5B, in step 520, MCU 302 is configured to transmit a message including a start bit S, slave address bits, and a read bit R on SDA 308 to flash memory unit 304. Flash memory unit 304 receives the message and is configured to transmit an acknowledgement bit A to MCU 302 in step 522. In step 524, on the basis of the read command R CMD bit(s) received in step 506 and the address bits received in step 510, flash memory unit 304 is configured to transmit the desired data stored in the memory cells identified by the memory address bits received in step 510. In step 526, after receiving all or a portion of bits of the desired data, MCU 302 is configured to transmit an acknowledgement bit A to flash memory unit 304. In some embodiments, the process of transmitting desired data by flash memory unit 304, as in step 524, and transmitting an acknowledgement bit A by MCU 302, as in step 526, is repeated until all of the desired data have been read. In step 528, MCU 302 is configured to transmit a stop bit P to conclude transmission or a re-start bit Sr to indicate it wishes to retain control of SDA 308. In some embodiments, MCU 302 is configured to transmit re-start Sr bit in step 514 so that MCU 302 and flash memory unit 304 can immediately begin the read process as explained with reference to FIG. 5B.

Including the read command R CMD bit(s) enables MCU 302 to read data from flash memory unit 304 using the I$^2$C protocol. In addition, read command R CMD bit(s) can indicate a particular speed for conducting the read operation. As a result, flash memory unit 304 is controlled to use the received address bits to send data to MCU 302 at a normal speed or fast speed, using the I$^2$C protocol.

FIGS. 5C and 5D are exemplary read-mode timing diagrams corresponding to method 500 shown in FIGS. 5A and 5B, respectively, showing data and clock signals respectively transmitted on SDA 308 and SCL 310. For the purpose of explaining the illustrated embodiment, it is assumed the data or addresses transmitted on SDA 308 are 8 bits long. Referring to FIG. 5C, in time period 550, a message including a start bit 5, slave address bits, and a read bit R is transmitted on SDA 308 from MCU 302 to flash memory unit 304. In the illustrated embodiment, the desired memory unit is flash memory unit 304 so that the slave address bits are the identifying address of flash memory unit 304. In time period 552, a first acknowledgement bit A is transmitted on SDA 308. In time period 554, a first address AD1(A15-A8) indicating a first portion of a start address for the read operation is transmitted on SDA 308 from MCU 302 to flash memory unit 304. In time period 556, a second acknowledgement bit A is transmitted on SDA 308 from flash memory unit 304 to MCU 302. In time period 558, a second address AD2(A7-A0) indicating a second portion of the start address for the read operation is transmitted on SDA 308 from MCU 302 to flash memory unit 304. In time period 560, a third acknowledgement bit A is transmitted on SDA 308 from flash memory unit 304 to MCU 302. In time period 562, a stop bit P to conclude transmission or a re-Start bit Sr to indicate that MCU wishes to retain control of SDA 308 is transmitted on SDA 308. In the illustrated embodiment, no command bit is transmitted from MCU 302 to flash memory unit 304 on SDA 308, which constitutes a default mode. That is, because of receiving no command bit, flash memory unit 304 recognizes the non-receipt as a command to perform a read operation at a default speed.

In FIG. 5C, time periods 550, 552, and 562 respectively correspond to steps 502, 504, and 514 shown in FIG. 5A. Time periods 554-560 correspond to steps 510 and 512 and repetition of those steps.

After flash memory unit 304 receives the read bit included in the message, the start address, and no command bit, it outputs data stored at the start address and at addresses following the start address. Referring to FIG. 5D, in time period 564, a message including a start bit S, the address bits of flash memory unit 304, and a read bit R is transmitted on SDA 308 from MCU 302 to flash memory unit 304. In time period 566, a fourth acknowledgement bit A is transmitted on SDA 308 from flash memory unit 304 to MCU 302. In time period 568, first data DATA0(D7-D0) stored at the start address are transmitted on SDA 308 from flash memory unit 304 to MCU 302. In time period 570, a fifth acknowledgement bit A is transmitted on SDA 308 from MCU 302 to flash memory unit 304. In time period 572, second data DATA1(D7-D0) stored at an address following the start address are transmitted on SDA 308 from flash memory unit 304 to MCU 302. In time period 574, a fifth acknowledgement bit A is transmitted on SDA 308 from MCU 302 to flash memory unit 304. The sequence of flash memory unit 304 transmitting 8 bits of data and MCU 302 acknowledging receipt by transmitting an acknowledgement bit A continues until a last N+1th transmission. Thus, in time period 576, N+1th data DATAN(D7-D0) are transmitted on SDA 308 from flash memory unit 304 to MCU 302. In time period 578, an end-of-reading bit END is transmitted on SDA 308 from MCU 302 to flash memory unit 304 to inform flash memory unit 304 not to send data thereafter. The process of transmitting data from flash memory unit 304 to MCU 302 and transmitting an acknowledgement bit A from MCU 302 to flash memory unit 304 can be repeated until a stop bit P to conclude transmission is transmitted on SDA 308 from MCU 302. In time period 580, the stop bit p is transmitted on SDA 308 from MCU 302 to flash memory unit 304 to conclude the transmission.

In FIG. 5D, time periods 564, 566, and 580 correspond to steps 520, 522, and 528 shown in FIG. 5B. Time periods 568-578 correspond to steps 524 and 526 and repetition of those steps.

Figure 6A:
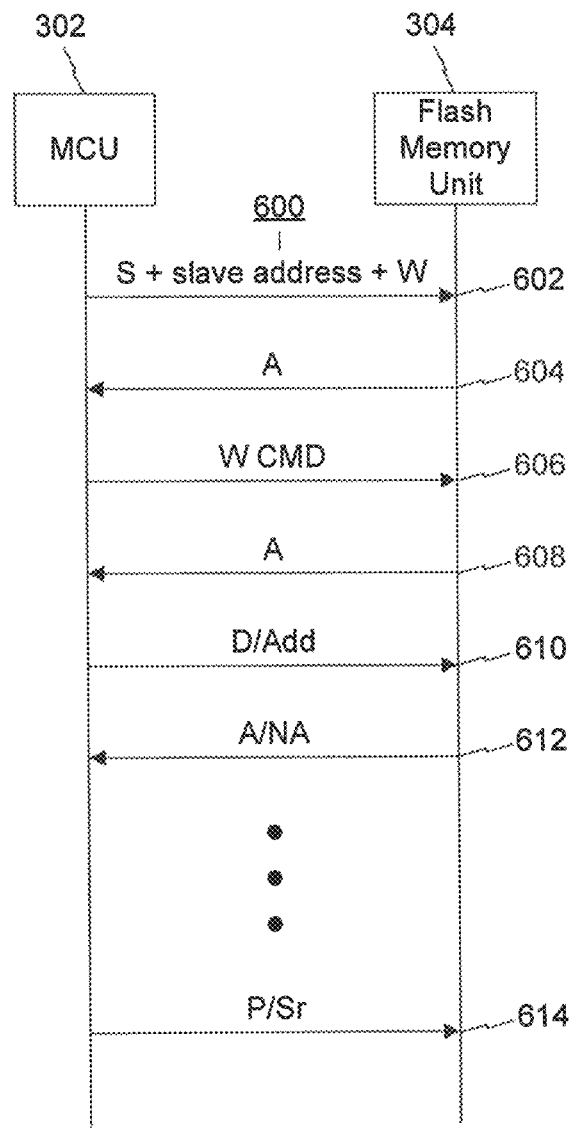
FIG. 6A shows a method performed by the I²C device configuration shown in FIG. 3 in a write mode, consistent with embodiments of the present disclosure.

FIG. 6A shows a method 600 for performing a write operation on flash memory unit 304, consistent with embodiments of the present disclosure. Although only MCU 302 and flash memory unit 304 are illustrated in FIG. 6A, MCU 302 may be coupled to one or more other flash memory units. For example, electronic unit 306 may be a flash memory unit. In addition, memory unit 304 may be coupled to one or more other MCUs. In step 602, MCU 302 is configured to transmit a message including a start bit S, slave address bits, and a write bit W on SDA 308 to a desired memory unit. In the illustrated embodiment, the desired memory unit is flash memory unit 304 so that the slave address bits are the identifying address of flash memory unit 304. The write bit W indicates that MCU 302 intends to perform a write operation to flash memory unit 304. Flash memory unit 304 receives the message and is configured to transmit an acknowledgement bit A to MCU 302 in step 604. In step 606, MCU 302 is configured to transmit a write command W CMD bit or bits indicating a particular mode of write operation MCU 302 will perform on flash memory unit 304. For example, the write command W CMD bit(s) may indicate that MCU 302 wishes to program or erase data stored in flash memory unit 304. In some embodiments, the write command W CMD bit(s) may further indicate what type of erase operation is to be performed. For example, the write command W CMD bit(s) may indicate an erase operation is to be performed to cause data to be erased block-by-block or sector-by-sector of flash memory unit 304, or that all data stored in flash memory unit 304 are to be erased at once. In some embodiments, write command W CMD bit(s) may indicate an erase operation followed by a write operation.

In step 608, memory unit 304 is configured to transmit an acknowledgement bit A to MCU 302. In step 610, after receiving the acknowledgement bit A, MCU 302 is configured to transmit predetermined bits of data or address D/Add to flash memory unit 304. In step 612, memory unit 304 is configured to transmit to MCU 302 an acknowledgement bit A indicating receipt of the data or address, or no acknowledgement bit NA indicating failure of receiving data or address from MCU 302. In some embodiments, the process of transmitting data or address from MCU 302, such as in step 610, and transmitting acknowledgement bit A or no acknowledgement bit NA from flash memory unit 304, such as in step 612, is repeated until MCU 302 has completed transmission of data or address bits to flash memory unit 304. In step 614, MCU 302 is configured to transmit a stop bit P to conclude transmission or a re-start bit Sr to indicate it wishes to retain control of SDA 308.

Including the write command W CMD bit(s) enables MCU 302 to control flash memory unit 304 using I²C protocol, including identifying the required mode of write operation. For example, in response to the write command W CMD bit(s) and any subsequent data or address bits transmitted from MCU 302, flash memory unit 304 is controlled to use the received data or address to program its memory cells or erase data stored in its memory cells, using the I²C protocol.

FIG. 6B is an exemplary program-mode timing diagram corresponding to method 600 shown in FIG. 6A, showing data and clock signals transmitted on SDA 308 and SCL 310, respectively, in a write operation. For the purpose of explaining the illustrated embodiment, it is assumed the data or addresses transmitted on SDA 308 are 8 bits long. Referring to FIG. 6B, in time period 620, a message including a start bit S, slave address bits, and a write bit W is transmitted on SDA 308 from MCU 302 to flash memory unit 304. In the illustrated embodiment, the desired memory unit is flash memory unit 304 so that the slave address bits are the identifying address of flash memory unit 304. In time period 622, a first acknowledgement bit A is transmitted on SDA 308 from flash memory 304 to MCU 302.

In time period 624, a first address AD1(A15-A8) indicating a first portion of a start address for the write operation is transmitted on SDA 308 from MCU 302 to flash memory unit 304. In time period 626, a second acknowledgement bit A is transmitted on SDA 308 from flash memory unit 304 to MCU 302. In time period 628, a second address AD2(A7-A0) indicating a second portion of the start address for the write operation is transmitted on SDA 308 from MCU 302 to flash memory unit 304. In time period 630, a third acknowledgement bit A is transmitted on SDA 308 from flash memory unit 304 to MCU 302. In time period 632, a command bit(s) CMD P is transmitted on SDA 308 from MCU 302 to flash memory unit 304. The command bit(s)

CMD P indicates that MCU 302 intends to program memory cells of flash memory unit 304 identified by the start address and those following the start address. In time period 634, a fourth acknowledgement bit A is transmitted on SDA 308 from flash memory unit 304 to MCU 302. In time periods 636, 640, 644, and 648, data (DATA0, DATA1, and DATA2, . . . , DATAN) to be written in flash memory unit 304 are transmitted on SDA 308 from MCU 302 to flash memory unit 304. After each of time periods 636, 640, 644, and 648, an acknowledgement bit A is transmitted on SDA 308 from flash memory unit 304 to MCU 302 in time periods 638, 642, 646, and 650. In time period 652, a stop bit P to conclude transmission or a re-Start bit Sr to indicate MCU 302 wishes to retain control of SDA 308 is transmitted on SDA 308.

In FIG. 6B, time periods 620, 622, 632, 634, and 652 correspond to steps 602, 604, 606, 608, and 614 shown in FIG. 6A. Time periods 624-630 and 636-650 correspond to steps 610 and 612 and the repetition of those steps.

FIG. 6C is an exemplary erase-mode timing diagram corresponding to method 600 shown in FIG. 6A, showing data and clock signals transmitted on SDA 308 and SCL 310, respectively. For the purpose of explaining the illustrated embodiment, it is assumed the data or addresses transmitted on SDA 308 are 8 bits long. Referring to FIG. 6C, in time period 660, a message including a start bit S, slave address bits, and a write bit W is transmitted on SDA 308 from MCU 302 to flash memory unit 304. In the illustrated embodiment, the desired memory unit is flash memory unit 304 so that the slave address bits are the identifying address of flash memory unit 304. In time period 662, a first acknowledgement bit A is transmitted on SDA 308 from flash memory 304 to MCU 302.

In time period 664, a first address AD1(A15-A8) indicating a first portion of a start address for the erase operation is transmitted on SDA 308 from MCU 302 to flash memory unit 304. In time period 666, a second acknowledgement bit A is transmitted on SDA 308 from flash memory unit 304 to MCU 302. In time period 668, a second address AD2(A7-A0) indicating a second portion of the start address for the erase operation is transmitted on SDA 308 from MCU 302 to flash memory unit 304. In time period 670, a third acknowledgement bit A is transmitted on SDA 308 from flash memory unit 304 to MCU 302. In time period 672, a command bit(s) CMD E is transmitted on SDA 308 from MCU 302 to flash memory unit 304. The command bit(s) CMD E indicates that MCU 302 intends to perform an erase operation on flash memory unit 304 at the memory cells identified by the start address and those following the start address. In some embodiments, the erase operation may be performed in an identified block or sector. In time period 674, a fourth acknowledgement bit A is transmitted on SDA 308 from flash memory unit 304 to MCU 302. In time period 676, a stop bit P to conclude transmission or a re-Start bit Sr to indicate MCU 302 wishes to retain control of SDA 308 is transmitted on SDA 308.

In FIG. 6C, time periods 660, 662, 672, 674, and 676 correspond to steps 602, 604, 606, 608, and 614 shown in FIG. 6A. Time periods 664-670 correspond to steps between steps 610 and 612.

Figure 7:
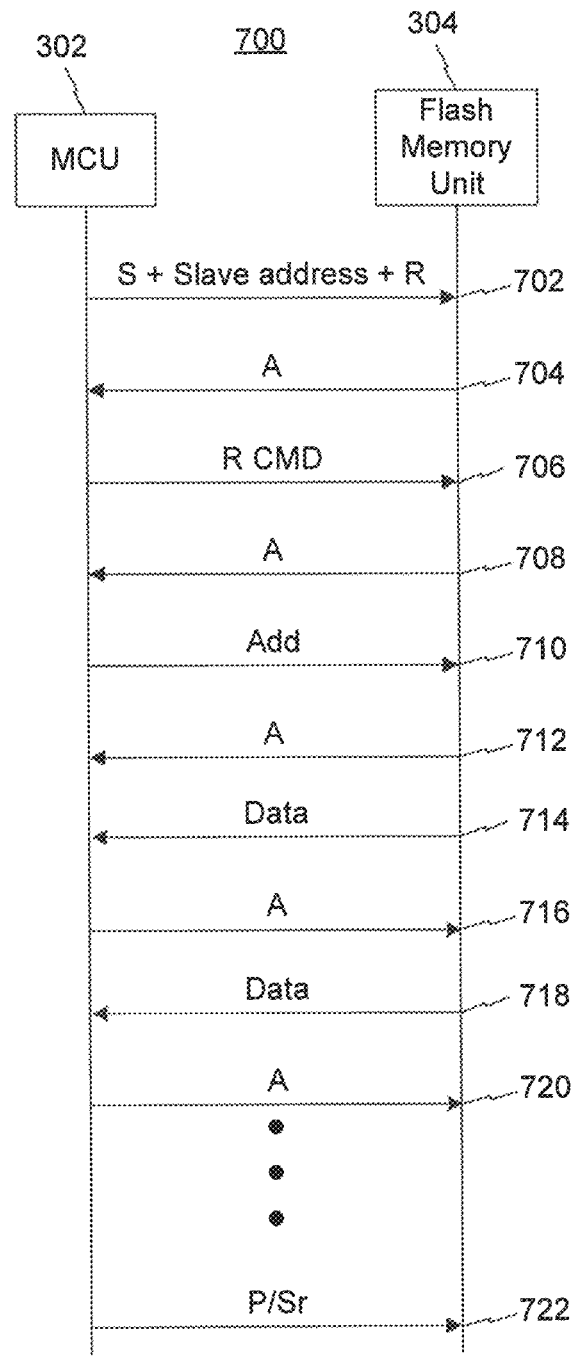
FIG. 7 shows an exemplary method performed by the I²C device configuration shown in FIG. 3 in a read mode, consistent with embodiments of the present disclosure.

FIG. 7 shows an exemplary method 700 for performing a read operation on flash memory unit 304 using the I2C protocol and including novel protocol features for implementing modes of operation consistent with embodiments of the present disclosure. Although only MCU 302 and flash memory unit 304 are illustrated in FIG. 7, MCU 302 may be coupled to one or more other flash memory units. In addition, flash memory unit 304 may be coupled to one or more other MCUs.

In step 702, MCU 302 is configured to transmit a message including a start bit S, slave address bits representing an address identifying flash memory unit 304, and an R bit on SDA 308. The start bit S indicates MCU 302 is taking control of SDA 308. The slave address is the identifying address of a unit with which MCU 302 wishes to communicate. In the illustrated embodiment, the slave address is the identifying address of flash memory unit 304. The R bit indicates whether MCU 302 intends to read data from flash memory unit 304. Flash memory unit 304 receives the message and is configured to transmit an acknowledgement bit A to MCU 302 in step 704. In step 706, MCU 302 is configured to transmit a read command R CMD bit or bits indicating a predetermined mode of flash memory read operation that MCU 302 will perform on flash memory unit 304. Different possible modes of read operation include, for example, reading data from flash memory unit 304 at a normal speed or fast speed as defined in, for example, the conventional Serial Peripheral Interface (SPI) flash command protocol.

In step 708, in response to read command R CMD bit(s), flash memory unit 304 is configured to transmit an acknowledgement bit A to MCU 302. In step 710, after receiving the acknowledgement, MCU 302 is configured to transmit predetermined bits of address Add to flash memory unit 304. The bits of address Add indicate a start address. The read operation is conducted starting from reading the data stored at the start address and addresses following the start address.

In step 712, flash memory unit 304 is configured to transmit to MCU 302 an acknowledgement bit A indicating receipt of the address bits. In step 714, flash memory unit 304 is configured to transmit data stored at the start address Add. In step 716, MCU is configured to transmit an acknowledgement bit A indicating receipt of the data transmitted from flash memory unit 304. In step 718, flash memory unit 304 is configured to transmit data stored at addresses following the start address Add. In step 720, MCU is configured to transmit an acknowledgement bit A indicating receipt of the data transmitted from flash memory unit 304. The process of transmitting data from flash memory unit 304 and acknowledging receipt of data by MCU 302 can be repeated until MCU 302 transmits a stop bit P to conclude transmission or a re-start bit Sr to indicate it wishes to retain control of SDA 308 at step 722.

In exemplary embodiments, there is also provided a non-transitory computer-readable storage medium storing instructions, such as included in one of flash memory unit 304 and electronic unit 306 or another memory device accessible by MCU 302, executable by memory device 300, for performing the above-described steps.

Figure 8:
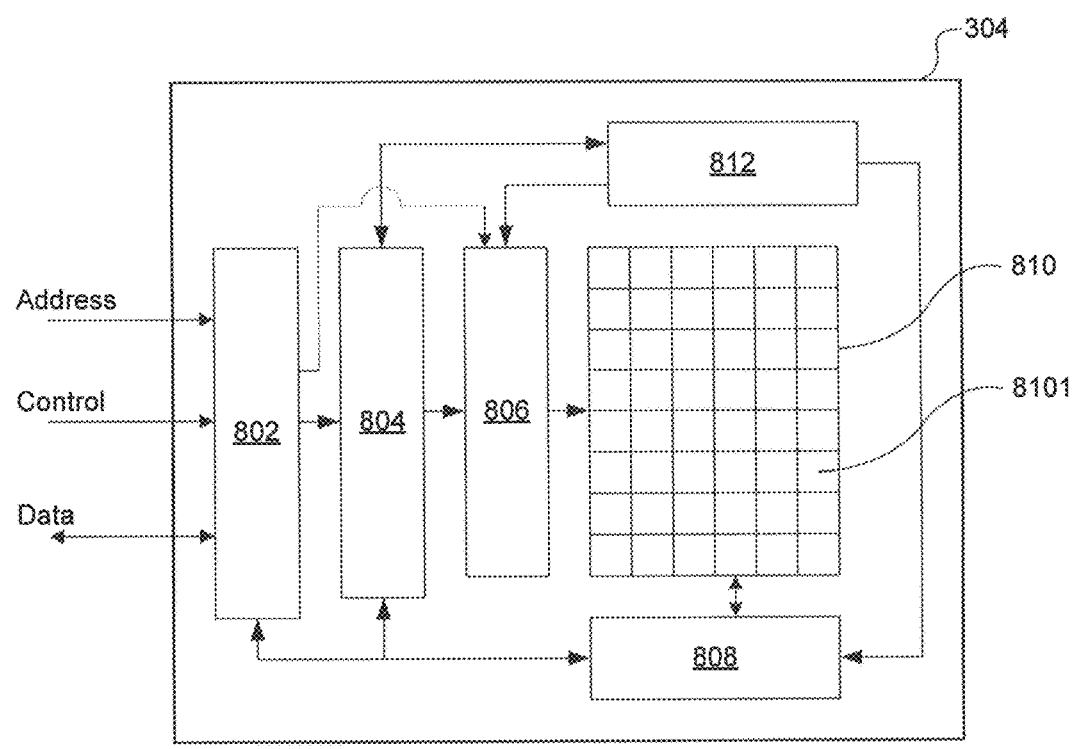
FIG. 8 is a block diagram showing an exemplary configuration of a flash memory unit, consistent with embodiments of this disclosure.

FIG. 8 is a block diagram representation of an exemplary configuration of flash memory unit 304. Referring to FIG. 8, flash memory unit 304 includes an input-output (I/O) section 802, a control circuit section 804, a row decoder 806, a column decoder 808, a cell array 810, and an analog section 812. I/O section 802 is configured to receive and buffer address, control, and data signals. Control circuit section 804 is configured to decode control signals, e.g., commands such as read, program, or erase, received by I/O section 802 and control analog section 812 to generate voltages for programing or erasing data stored in cell array 810. Row decoder 806 is configured to perform sector decoding and row decoding functions, according to address signals received from I/O section 802, and apply voltages to word lines of cell array 810 for read and program operations. Column decoder 808 is configured to decode address signals and, in a read operation, column decoder 808 connects bit lines to sense amplifiers (not shown). In a program or erase operation, column decoder 808 provides program or erase voltages to bit lines. Cell array 810 includes a plurality of flash memory cells 8101, which are configured to store data. Analog section 812 is configured to generate voltages for read, write, and erase operations.

Other embodiments of the disclosure will be apparent to those skilled in the art from consideration of the specification and practice of the invention disclosed herein.

It is intended that the specification and examples be considered as exemplary only, with a true scope and spirit of the invention being indicated by the following claims.

What is claimed is:

1. An electronic device, comprising:
a processor coupled to a memory device, through a data bus to receive and transmit bits on the data bus, the processor being configured to:
transmit a message including a first bit indicative of controlling the data bus, address bits indicative of an address identifying the memory device, and a second bit indicative of whether the processor intends to read data from or write data to the memory device;
transmit bits of data or memory address information; and
transmit a third bit indicative of a memory read mode or a memory write mode selected among:
reading data from the memory device at a serial peripheral interface speed,
reading data from the memory device at a speed faster than the serial peripheral interface speed,
erasing data block-by-block from the memory device, and
erasing all data from the memory device at once,
wherein
the third bit is transmitted after the bits of data or memory address information.

2. The electronic device according to claim 1, wherein the processor is further configured to transmit a fourth bit indicative of concluding communication with the memory device or retaining control of the data bus.

3. The electronic device according to claim 2, wherein the third bit is transmitted before the fourth bit.

4. The electronic device according to claim 1, wherein
the processor is further configured to receive at least two acknowledgements from the memory device, and
the third bit is transmitted after the at least two acknowledgements.

5. The electronic device according to claim 4, wherein:
the processor is further coupled to the memory device through a serial clock line;
the bits of data or memory address are eight bits long; and
the acknowledgements are transmitted every ninth signal of the serial clock line.

6. The electronic device according to claim 5, wherein the third bit is eight bits long.

7. The electronic device according to claim 1, wherein the processor is further configured to:
receive a first acknowledgement from the memory device between transmitting the message and transmitting the third bit; and
receive a second acknowledgement from the memory device between transmitting the bits of data or memory address information and transmitting the third bit.

8. The electronic device according to claim 7, wherein
the bits of data or memory address information are initial bits of data or memory address information; and
the processor is further configured to:
receive a third acknowledgement from the memory; and
transmit subsequent bits of data or memory address information,
wherein the third acknowledgement is received between the third bit and the subsequent bits of data or memory address information.

9. The electronic device according to claim 1, wherein the processor and the memory device are compatible with an inter-integrated circuit protocol.

10. The electronic device according to claim 1, wherein to transmit bits of data or memory address, the processor is further configured to:
transmit a high byte of data or memory address;
receive an acknowledgement after transmitting the high byte; and
transmit a low byte of data or memory address after receiving the acknowledgement.

11. A memory device coupled to a control unit, through a data bus to receive and transmit bits on the data bus, the memory device being configured to:
receive a message from the control unit, the message including a first bit indicative of the control unit controlling the data bus, address bits indicative of an address identifying the memory device, and a second bit indicative of whether the control unit intends to read data from or write data to the memory device; and
receive bits of data or memory address information;
receive a third bit from the control unit, the third bit being indicative of a mode selected among:
reading data from the memory device at a serial peripheral interface speed,
reading data from the memory device at a speed faster than the serial peripheral interface speed,
erasing data block-by-block from the memory device, and
erasing all data from the memory device at once; and
wherein the third bit is received after the bits of data or memory address information.

12. The memory device according to claim 11, wherein the memory device is further configured to:
in response to the receipt of the message, transmit a first acknowledgement to the control unit; and
in response to the receipt of the third bit, transmit a second acknowledgement to the control unit.

13. The memory device according to claim 11, wherein the memory device is a flash memory device.

14. A data exchange method executable by an electronic device, the electronic device including a data bus, and a processor coupled to a memory device through the data bus to receive and transmit bits on the data bus, the method comprising:
transmitting, by the processor, a message including a first bit indicative of controlling the data bus, address bits indicative of an address identifying the memory device, and a second bit indicative of whether the processor intends to read data from or write data to the memory device;
transmitting bits of data or memory address information, and
transmitting, by the processor, a third bit indicative of a memory read mode or a memory write mode selected among:

reading data from the memory device at a serial peripheral interface speed,
reading data from the memory device at a speed faster than the serial peripheral interface speed,
erasing data block-by-block from the memory device, and
erasing all data from the memory device at once,
wherein
the third bit is transmitted after the bits of data or memory address information.

15. The method according to claim 14, further comprising transmitting, by the processor, a fourth bit indicative of concluding communication with the memory device or retaining control of the data bus.

16. The method according to claim 15, wherein the third bit is transmitted before the fourth bit.

17. The method according to claim 14, further comprising:
receiving, by the processor, at least two acknowledgements from the memory device;
wherein the third bit is transmitted after receiving the at least two acknowledgements.

18. The method according to claim 14, further comprising:
receiving a first acknowledgement between transmitting the message and transmitting the third bit; and
receiving a second acknowledgement between transmitting the data or memory address information and transmitting the third bit.

19. The method according to claim 18, wherein
the bits of data or memory address information are initial bits of data or memory address information; and
the method further comprises:
receiving, by the processor, a third acknowledgement; and
transmitting, by the processor, subsequent bits of data or memory address information,
wherein the third acknowledgement is received between the third bit and the subsequent bits of data or memory address information.

20. A data exchange method executable by a memory device coupled to a control unit through a data bus to receive and transmit bits on the data bus, the method comprising:
receiving a message from the control unit, the message including a first bit indicative of controlling the data bus, address bits indicative of an address identifying the memory device, and a second bit indicative of whether the control unit intends to read data from or write data to the memory device;
receiving bits of data or memory address information;
receiving a third bit from the control unit indicative of a memory read mode or a memory write mode of the memory device selected among:
reading data from the memory device at a serial peripheral interface speed,
reading data from the memory device at a speed faster than the serial peripheral interface speed,
erasing data block-by-block from the memory device, and
erasing all data from the memory device at once; and
wherein the third bit is received after the bits of data or memory address information.

* * * * *